United States Patent
Hagedorn

(10) Patent No.: US 9,726,146 B2
(45) Date of Patent: Aug. 8, 2017

(54) ASSEMBLY FOR FIXING A ROTOR BLADE OF A WIND POWER PLANT

(71) Applicant: AREVA Wind GmbH, Bremerhaven (DE)

(72) Inventor: Ralf Hagedorn, Holdorf (DE)

(73) Assignee: AREVA WIND GMBH (DE)

( * ) Notice: Subject to any disclaimer, the term of this patent is extended or adjusted under 35 U.S.C. 154(b) by 314 days.

(21) Appl. No.: 14/362,708

(22) PCT Filed: Dec. 6, 2012

(86) PCT No.: PCT/EP2012/074607
§ 371 (c)(1),
(2) Date: Jun. 25, 2014

(87) PCT Pub. No.: WO2013/083677
PCT Pub. Date: Jun. 13, 2013

(65) Prior Publication Data
US 2014/0363289 A1    Dec. 11, 2014

(30) Foreign Application Priority Data

Dec. 6, 2011 (EP) .................................. 11192209

(51) Int. Cl.
*F03D 7/02* (2006.01)
*F03D 7/04* (2006.01)

(52) U.S. Cl.
CPC ......... *F03D 7/0244* (2013.01); *F03D 7/0224* (2013.01); *F03D 7/0268* (2013.01); *F03D 7/04* (2013.01); *F05B 2260/90* (2013.01); *Y02E 10/721* (2013.01); *Y02E 10/723* (2013.01)

(58) Field of Classification Search
CPC ......... F03D 7/0224; F03D 7/0268; F03D 7/04
See application file for complete search history.

(56) References Cited

U.S. PATENT DOCUMENTS

| 5,178,518 A * | 1/1993 | Carter, Sr. ................. F03D 1/00 416/11 |
| 6,609,889 B1 * | 8/2003 | Vilsboll ............... F03D 7/0224 415/4.3 |
| 2004/0253093 A1 * | 12/2004 | Shibata ................... F03D 1/025 415/4.1 |

(Continued)

FOREIGN PATENT DOCUMENTS

| CN | 1650104 A | 8/2005 |
| DE | 102009009017 | 8/2010 |

(Continued)

OTHER PUBLICATIONS

Taiwanese Office Action dated Feb. 5, 2015 in Taiwanese Patent Application No. 10420129190.

(Continued)

*Primary Examiner* — Woody Lee, Jr.
(74) *Attorney, Agent, or Firm* — Plumsea Law Group, LLC

(57) ABSTRACT

The invention relates to an assembly and a method of fixing a rotor blade of a wind power plant. The wind power plant comprises a rotor blade, a pitch adjustment means, a bearing for the rotor blade and a brake disk. There is an electromechanical brake configured to apply a controlled brake force to the brake disk that is a function of the pitch angle of the rotor blade.

8 Claims, 4 Drawing Sheets

Fig. 4

(56) References Cited

U.S. PATENT DOCUMENTS

| | | | |
|---|---|---|---|
| 2005/0175456 A1* | 8/2005 | Uphues | B64C 11/325 |
| | | | 416/132 B |
| 2009/0058086 A1* | 3/2009 | Arinaga | F03D 7/0224 |
| | | | 290/44 |
| 2009/0115191 A1 | 5/2009 | Warfen et al. | |
| 2009/0155075 A1* | 6/2009 | Guey | F03D 7/0224 |
| | | | 416/147 |
| 2009/0162202 A1* | 6/2009 | Nies | F03D 1/003 |
| | | | 416/147 |
| 2011/0142594 A1 | 6/2011 | Dinjus et al. | |
| 2011/0187107 A1 | 8/2011 | Toyohara et al. | |
| 2011/0299975 A1* | 12/2011 | Pechlivanoglou | F03D 7/0204 |
| | | | 415/123 |
| 2012/0299301 A1* | 11/2012 | Han | F03B 3/18 |
| | | | 290/52 |
| 2014/0169965 A1* | 6/2014 | Fukami | F03D 7/0268 |
| | | | 416/1 |

FOREIGN PATENT DOCUMENTS

| | | |
|---|---|---|
| JP | 2004364370 | 12/2004 |
| TW | 200925414 | 6/2009 |
| WO | 03091570 | 11/2003 |
| WO | 2005019642 | 3/2005 |

OTHER PUBLICATIONS

International Search Report and Written Opinion mailed Feb. 25, 2013 in International Application No. PCT/EP2012/074607.
International Preliminary Report on Patentability (including Written Opinion of the ISA) mailed Jun. 19, 2014 in International Application No. PCT/EP2012/074607.
Japanese Office Action mailed Jul. 7, 2015 in Japanese Patent Application No. 2014-545251.
Office Action issued May 30, 2016 for Chinese Patent Application No. 201280069108.5.

* cited by examiner

ASSEMBLY FOR FIXING A ROTOR BLADE OF A WIND POWER PLANT

FIELD OF THE INVENTION

The invention relates to an assembly for fixing a rotor blade of a wind power plant.

BACKGROUND

Modern wind energy plants provide control of power and rotor speed by changing the aerodynamic force that is applied to the rotor. Usually, this is performed by changing the pitch of the rotor blades. The operation of a wind energy plant or a wind turbine may be divided into two regimes. In a first regime, at lower wind speeds, no pitch activity during operation of the power plant is necessary. The rotor blade is fixed or held in an optimal aerodynamic position. In a second regime, at higher wind speeds of typically more than 12 ms or in turbulent wind situations, pitch activity, i.e. a frequent adjustment of the pitch of the rotor blades, is necessary during operation of the wind turbine. A transition between the two regimes will occur e.g. for freshening winds.

However, most of the time, the rotor blade is in either of two fixed positions relating, for example to lower wind speeds and to the situation, when the wind turbine is shut down. The rotor blade is then held in a specific position by brake forces applied to the shaft of the pitch drive. The pitch drive is then switched off. The brakes are fail-safe brakes. This means that they open when power is applied to them and closed when the power supply is interrupted. The advantage of this prior art configuration is that the brakes can be dimensioned for rather small brake torques due the gear and gear transmission ratio.

One of the drawbacks of this solution is that the play caused by the annular gear of the bearing meshing with the drive bevel of the gearbox of the rotor blade allows the rotor blade to move even when the brake is closed with maximum torque. This results in an undesired wear and abrasion of these components.

If the pitch drive or other components for rotating the rotor blade are exchanged, the previously described brake system fails and the rotor blade cannot be fixed until the maintenance or service operation is completed.

Another drawback is that the brake has to be dimensioned in accordance with the maximum torque resulting from the turbine design. The nominal torque of the brake is then often greater than the peak torque that can be achieved with the pitch drives. If the brake is closed due to a failure, the rotor blade cannot be rotated anymore and the blade remains in the position that was assumed when the failure occurred.

In order to avoid this problem, the pitch drive has to be configured to have even greater torque in order to overcome the brake force. This increases the dimensions and costs for the pitch drives.

German patent application DE 10 2009 008607 discloses a locking mechanism for fixing the rotor blade in any arbitrary position. However, once the rotor blade is locked, it cannot be moved anymore.

Other possibilities in order to overcome the above mentioned drawbacks are redundant brake systems, where two brakes are provided each of which applies half the maximum necessary torque. If one of the brakes fails, the pitch drives can still rotate the rotor blade. However, redundant brake systems need more components.

SUMMARY

It is an object of the invention to provide an assembly for fixing a rotor blade of a wind power plant and a method, as well as a wind power plant with a pitch adjustment means that overcomes the aforementioned drawbacks.

In one aspect of the invention, there is an assembly for fixing (holding the rotor blade at specific pitch angle) a rotor blade of a wind power plant comprising a rotor blade, a pitch adjustment means, a bearing for the rotor blade and a brake disk coupled between the rotor blade bearing and the rotor blade root. The assembly further comprises an electro-mechanical brake configured to apply a controlled brake force to the brake disk that is a function of the pitch angle of the rotor blade.

The electro-mechanical brake can be configured to apply a first controlled brake force to the brake disk in a first position of the rotor blade and a second controlled brake force in second position of the rotor blade. The controlled brake force is a mechanical braking torque that is applied to the brake disk and thereby to the rotor blade. This allows the optimum brake force to be applied at any time and at any pitch angle of the rotor blade.

The pitch adjustment means can be electrical, mechanic or hydraulic or a combination of these concepts.

The pitch adjustment means can comprise a pitch drive and a gear for the pitch drive. The pitch adjustment means can comprise a single pitch drive or multiple pitch drives.

The brake disk can be coupled between the rotor blade bearing and the rotor blade root.

The brake disk can be an integral component of the rotor blade. This can substantially simplify construction.

However, a separate brake disk that is located in the rotor blade root may be useful to stabilize the rotor blade root.

In another embodiment the brake disk and the electro-mechanical brake may be located outside the rotor blade root.

The brake disk may be coupled to the hub of the wind power plant.

The electro-mechanical brake may be mounted on the rotor blade root. The electro-mechanical brake and the brake disk may both be located outside the hub of the wind power plant.

The assembly according to aspects of the invention can be configured to control the electro-mechanical brake as a normally-off brake (also referred to as positive brake) in one position (one pitch angle) and as a normally-on brake (also referred to as fails-safe brake or negative brake) in another position (another pitch angle).

The two positions or pitch angles can be the first and the second position or in other words, a first and a second pitch angle.

In the first position (pitch angle), the brake force can be such that the torque provided by the pitch drive can overcome the brake force.

In other words, in the first position, the brake force can advantageously be configured such that the resulting brake torque is lower than the maximum torque that can be provided by the pitch adjustment means.

The first position can advantageously be the normal operating position or working position (i.e. the corresponding pitch angle of the rotor blade). The normal operating position or working position can advantageously be the optimal aerodynamic position (pitch angle) of the blade (for which the blade is designed).

In an embodiment, the first position (pitch angle) can be the 0°-position. The 0°-position can then be a normal operating position.

In the second position (pitch angle), the brake force can be configured such that the torque provided by the pitch drive cannot overcome the brake force.

In other words, in the second position, the brake force can advantageously be configured such that the resulting brake torque is higher than the maximum torque that can be provided by the pitch adjustment means.

Advantageously, the second position (pitch angle) can be a 90°-position or feathering position. This can be advantageous in an emergency shutdown of the wind turbine. In such a case, the rotor has to be stopped as fast as possible and accordingly, the rotor blades are moved to the feathering position or a pitch angle of 90° so as to generate a maximum wind resistance and to slow down the rotor. This 90° pitch angle is also referred to as a "feathering position" or "feather-position". The feathering position is also assumed for service and maintenance. In this position the rotor blade cannot be rotated anymore.

Using a brake with an continuously adjustable brake force (i.e. an adjustable mechanical braking torque) that applies the brake force or braking torque to a brake disk that is directly coupled to the rotor blade overcomes the various drawbacks of the prior art.

In an advantageous embodiment of the invention, the brake is an electro-mechanical brake comprising an electrical brake drive, a transmission for transferring an action of the electrical brake drive into a movement of brake shoes. Using an electro-mechanical brake provides the advantage that the brake can be operated by an emergency power supply, if the primary power supply fails. Wind power plants are usually equipped with emergency power supplies.

In advantageous embodiment of the invention, the brake force can be adjusted to apply maximum brake force once a predefined rotation angle is reached. If any safety mechanism for the pitch drive fails, the rotor blade can then be fixed by the brake.

The invention also provides a wind energy plant comprising the assembly according to the aspects and embodiments of the invention.

The invention provides a wind power farm comprising several wind energy plants that comprise the assembly according to aspects of the invention.

The invention further provides a method of fixing a rotor blade of a wind power plant. The wind power plant comprises a rotor blade, a pitch adjustment means, a, a bearing for the rotor blade and a brake disk. A controlled brake force can then be applied to the brake disk that is function of the pitch angle of the rotor blade.

A first controlled brake force can then be applied to the brake disk in a first position of the rotor blade and a second controlled brake force can be applied to the brake disk in a second position of the rotor blade.

BRIEF DESCRIPTION OF DRAWINGS

Further aspects of the invention will ensue from the following description of an example embodiment of the invention with reference to the accompanying drawings, wherein.

DETAILED DESCRIPTION OF EXAMPLE EMBODIMENTS

Figure 1:
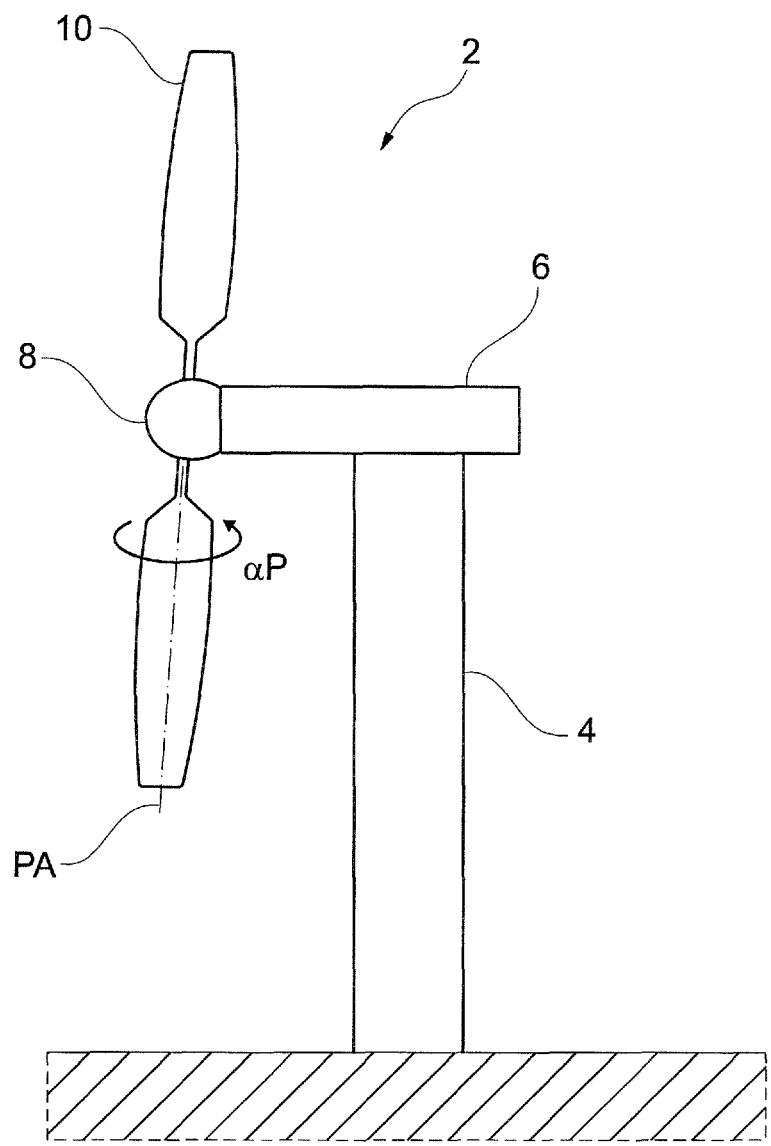
FIG. 1 shows a simplified wind energy plant.

FIG. 1 is a simplified view of a wind energy plant 2 having a supporting structure 4 carrying a generator 6 having a rotor with a rotor hub 8 carrying rotor blades 10 that are rotatable around a pitch axis PA by a pitch angle αP.

Figure 2:
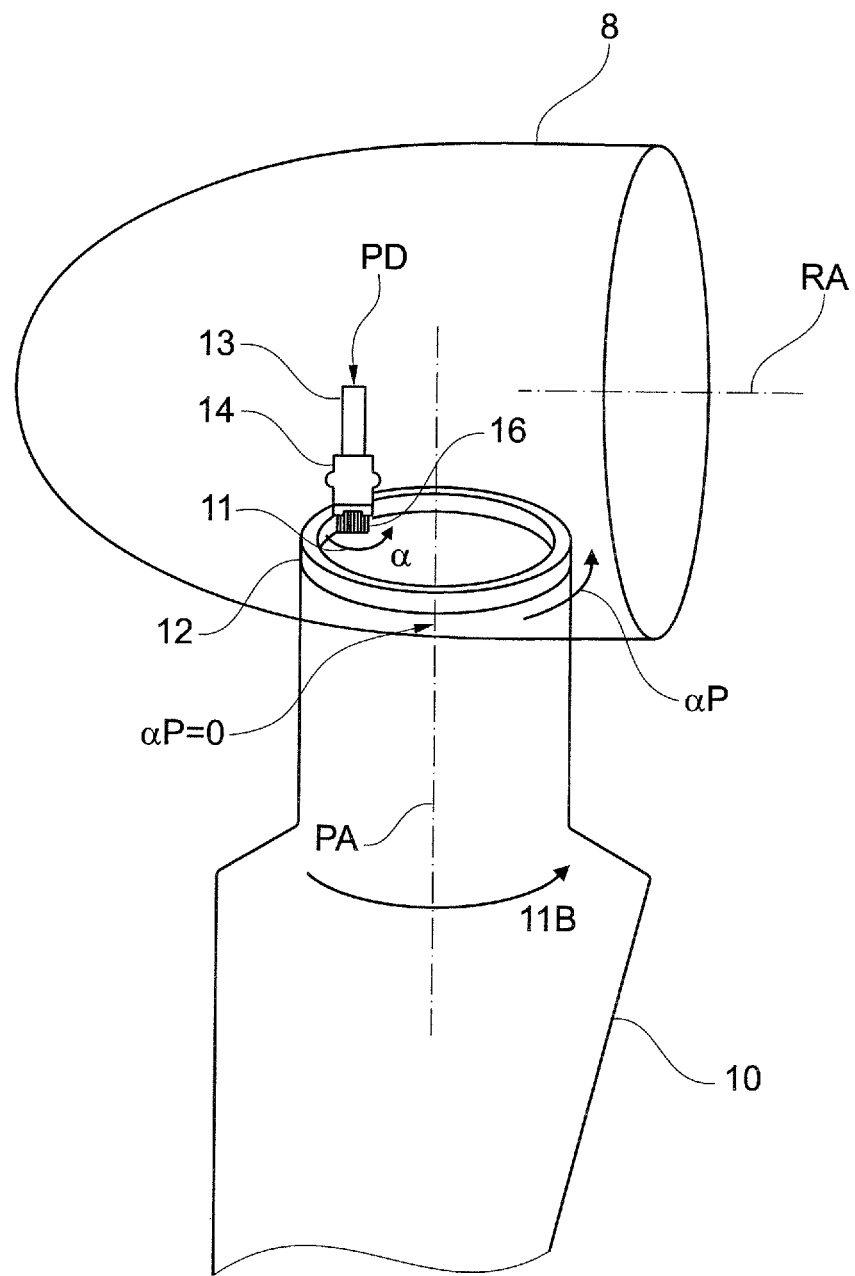
FIG. 2 shows a simplified detailed view of the wind energy plant of FIG. 1.

FIG. 2 is a more detailed simplified view of the rotor hub 8 rotating around a rotor axis RA during operation of the wind energy plant 2. The rotor hub 8 carries a rotor blade 10 that is rotatable around a pitch axis PA by a pitch angle αP. An annular gear 12 (with annular bearing) is fixed to the rotor blade 10. A pitch drive PD is fixed to the rotor hub 8. The pitch drive PD comprises an electric motor 13 having a driven shaft that is mounted to a drive shaft (fast shaft) of an epicyclic gear 14. The driven shaft of the epicyclic gear 14 is mounted to a drive bevel 16 engaging the annular gear 12. The pitch drive PD applies a torque M to the annular gear 12 by rotating the drive bevel 16 by an angle α.

In order to simplify the understanding, in the context of this specification, the torque M is indicated by a direction of rotation rather than by the corresponding torque vector. In this regard, the direction of rotation corresponds to a free movement of the pitch drive PD in response the corresponding torque M. The corresponding torque vector can be derived from the direction of rotation by help of the known right hand rule. Accordingly, the torque that is applied by the pitch drive PD is indicated by M that is directed in the same direction as the angle of rotation α of the drive bevel 16.

In another embodiment, multiple pitch drives may be used.

Furthermore, the present invention also applies to pitch adjustment means which are either hydraulic or mechanic.

The blade torque (indicated by direction of rotation MB) is due to aerodynamic and gravitational forces on the rotor blade 10 and is generated during operation of the wind energy plant 2. During operation of the wind energy plant 2 in a wind regime where no pitch activity is necessary, the rotor blades 10 need to be set to an optimal pitch angle. This is typically referred to as αP=0° or 0°-position. The rotor blade 10 has to be fixed or held in this optimal position.

In accordance with an embodiment of the invention, the rotor blade can be held in this position by an electro-mechanical brake. The torque applied by the electro-mechanical brake can then be just large enough for fixing the rotor blade, but not too large, so that the pitch drive or pitch drives can overcome the braking torque.

However, in a 90°-position, the braking torque can be increased so that the pitch drive can not overcome the braking torque or brake force anymore.

Figure 3:
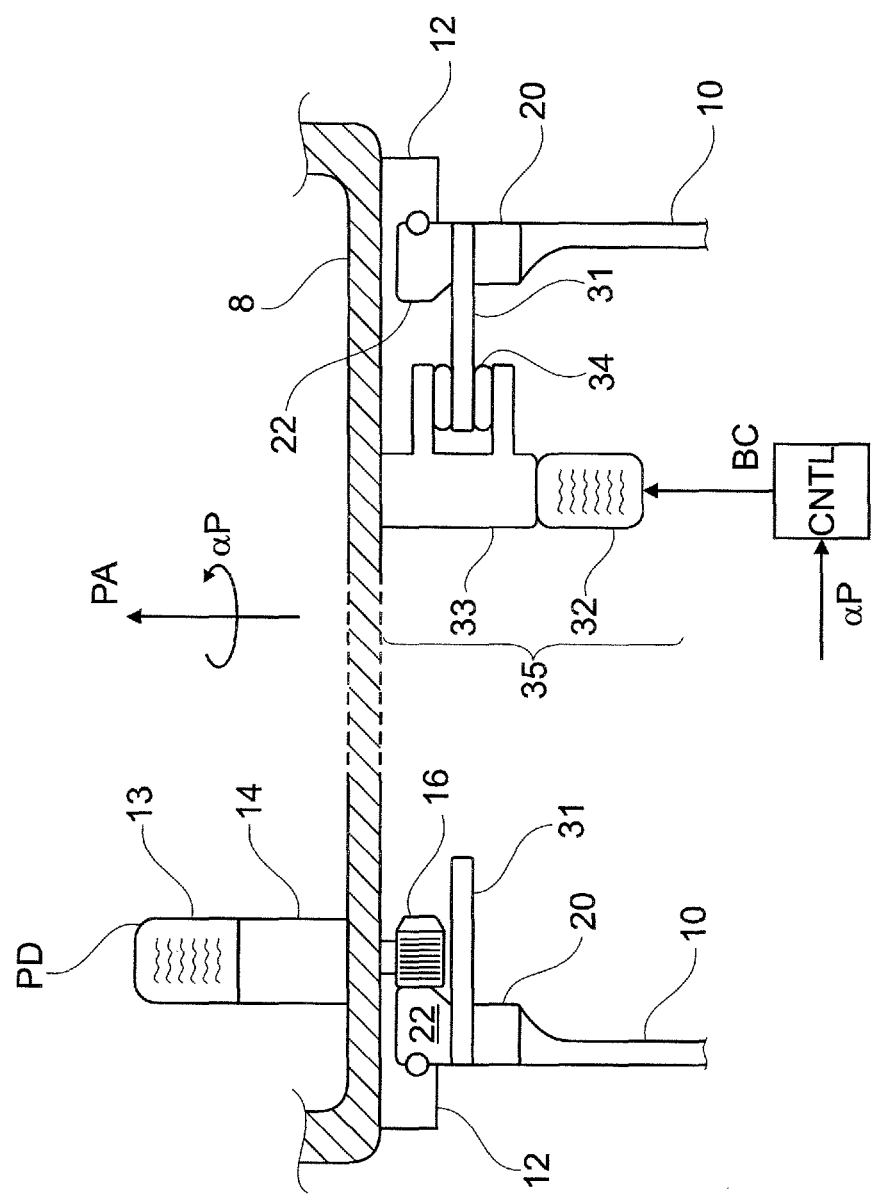
FIG. 3 shows a simplified cross sectional view through a rotor blade and the rotor blade root and parts of the hub of a wind power plant in accordance with an embodiment of the invention.

FIG. 3 shows a simplified cross sectional view through a rotor blade 10 and the rotor blade root 20 and parts of the hub 8 in accordance with an embodiment of the invention. There is a pitch drive PD that consists of the electric motor 13 and the gear 14 as well as the drive bevel 16 that is coupled to the inner side of an annular gear 12 (or bearing) for rotating the rotor blade 10 (only partially visible) around axis PA by an angle αP. The rotor blade 10 has a rotor blade root 20 to which the brake disk 31 is coupled. There is further the electro-mechanical brake 35 that comprises a mechanical part 33 and an electric motor 32 as well as brake shoes 34 which are coupled to the mechanical part 33. In response to a brake control signal BC from a control stage CNTL (anywhere in the wind power plant), the brake force applied by the brake shoes to the brake disk 31 is adjusted.

The control stage can generate the required brake control signal BC in response to (as a function of) the rotational angle αP. The brake force can then be increased in order to assume a maximum in the 90°-position and a minimum or at least smaller value in the 0°-position.

In order to avoid damage of the wind power blade, the control stage CNTL can be configured to control the electro-mechanical brake so as to provide a maximum brake force if a specific angle αP is reached or exceeded.

The brake disk 31 can be a separate component that is coupled to the rotor blade root 20. It can also be integral part of the rotor blade.

The brake disk 31 can be provided over the full inner circumference of the rotor blade, i.e. over 360°. However, the brake disk can also be limited to 120° of the inner circumference of the rotor blade root 20.

In another embodiment, the brake disk can also be mounted on the hub, and the electro-mechanical brake may be mounted on the rotor blade root.

Figure 4:
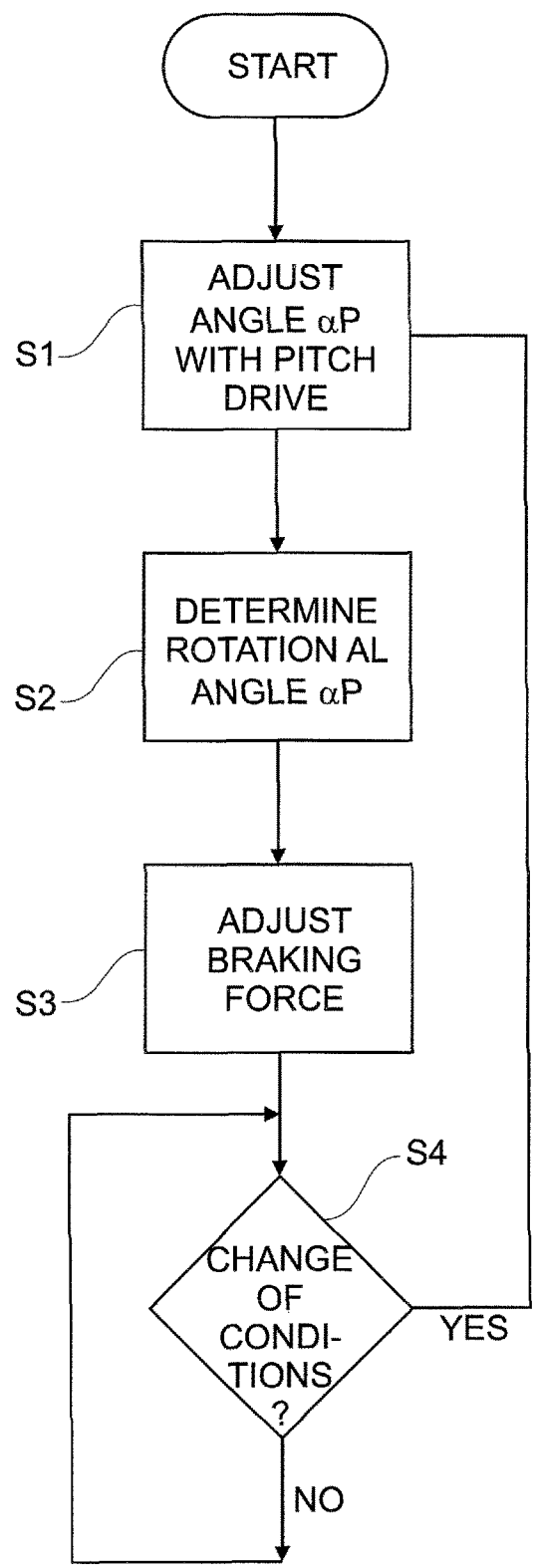
FIG. 4 shows a simplified flow chart illustrating the operation according to aspects of the invention.

FIG. 4 shows a simplified flow chart illustrating the operation according to aspects of the invention. After initializing the wind power plant that comprises the assembly in accordance with the invention, the pitch angle αP is adjusted in step S1 by controlling the pitch adjustment means (for example, a pitch drive). Once the pitch angle or rotational angle of the rotor blade αP has changed, the new angle is determined in step 82. In response to a change of the pitch angle αP, the brake force or braking torque of the electro-mechanical brake is adjusted. This is advantageously done as described above. After having adjusted the brake force in step S2, the system enters into a loop in which the conditions, as for example wind speed etc., are monitored. If a change of conditions occurs that requires adjustment of the pitch angle αP, the rotor blade is rotated in step S1, the new angle αP is determined and the braking force adjusted, if an adjustment is necessary. Generally, the brake force of the electro-mechanical brake is adjusted as a function of the pitch angle of the rotor blade.

Although the invention has been described hereinabove with reference to specific embodiments, it is not limited to these embodiments and no doubt further alternatives will occur to the skilled person that lie within the scope of the invention as claimed.

The invention claimed is:

1. An assembly for fixing a rotor blade of a wind power plant comprising a rotor blade, a pitch adjustment means, a bearing for the rotor blade and a brake disk, wherein the assembly further comprises an electro-mechanical brake configured to apply a controlled brake force to the brake disk that is a function of the pitch angle of the rotor blade, and
wherein the electro-mechanical brake is configured to apply a first controlled brake force to the brake disk in a first position of the rotor blade and a second controlled brake force in a second position of the rotor blade.

2. The assembly according to claim 1, wherein, in the first position, the brake force is such that the torque provided by the pitch adjustment means can overcome the brake force.

3. The assembly according to claim 2, wherein, in the second position, the brake force is such that the torque provided by the pitch adjustment means cannot overcome the brake force.

4. The assembly according to claim 1, wherein the first position is the 0°-position or an optimum working position.

5. The assembly according to claim 1, wherein the second position is 90°-position or feathering position.

6. The assembly according to claim 1, wherein the electro-mechanical brake is configured to apply a maximum brake force once a predefined rotation angle of the rotor blade is reached.

7. A wind energy plant comprising the assembly according to claim 1.

8. A method of fixing a rotor blade of a wind power plant, the wind power plant comprising a rotor blade, a pitch adjustment means, a bearing for the rotor blade and a brake disk, the method comprising the steps of:
controlling an electro-mechanical brake so as to apply a controlled brake force to the brake disk which depends on the pitch angle, and
controlling the electro-mechanical brake so as to apply a first controlled brake force to the brake disk in a first position of the rotor blade and a second controlled brake force in a second position of the rotor blade.

* * * * *